Patented May 21, 1935

2,002,146

UNITED STATES PATENT OFFICE 2,002,146

MEAT TREATING METHOD

Lloyd B. Jensen, Chicago, Ill., assignor to Industrial Patents Corporation, Chicago, Ill., a corporation of Delaware No Drawing. Application January 13, 1933, Serial No. 651,627

11 Claims. (Cl. 99—11)

This invention relates to a new and improved method of treating meat products by which the desirable red coloring of the meat tissue is assured.

Although this invention is not so limited, it has particular usefulness in connection with the production of cured meat products and its use in the production of cured meat assures the fixation of color and the elimination of the wastes, losses and expense which have heretofore resulted from curing processes.

It is intended to include as a part of this invention, the finished meat products as articles of manufacture in that they are unique and possess a strong resistance to deterioration by oxidation of the hemoglobin derived pink pigments and the attendant discoloration of the meat tissue.

This invention is based upon the principle of providing a reducing agent in association with the cells of the muscle tissue of the meat by utilizing an injected compound, such as a salt, which is acted upon or in some wise influenced by certain enzymes present in the meat and is thereby converted into the desired reducing agent.

Accordingly, this invention utilizes the action of enzymes, naturally present in the cellular tissue of the meat for the formation of agents acting to reduce the hemoglobin or hemochromogens which are present, and involves the reduction of the hemoglobin by the action of reducing agents so created.

It is well known that the red color of blood is attributable to hemoglobin in which compound, iron is in the ferrous state. However, by oxidation, the ferrous iron may be converted into ferric iron and during the stages of such oxidation the changes involved in oxidizing ferrous iron to ferric iron are heralded by changes from the desired pink colors to discolorations ranging from brownish grey to green grey in the meats.

It is accordingly an object of this invention to prevent, in meat products, the conversion of the ferrous iron constituents of hemoglobin or pink pigments to ferric iron, and to accomplish this result by the presence of a suitable biological reducing agent or agents such as the non-poisonous hydrogen donators.

It is a further object to so treat meat products that the desired red color will be assured and in addition, the meat will be free from liability of oxidation and consequent spoilage during curing or similar treatment or handling, and to accomplish this result, in a controlled, predetermined manner by particular method and means selected according to the type and condition of meat undergoing treatment.

In connection with curing processes, it is a further object of this invention to assure the formation of reduced hemochromogens and hemoglobin derived compounds for proper reaction with the oxides and other compounds of nitrogen and the resulting fixation of the color in the cured product by the formation of the more stable nitroso hemochromogens or nitroso hemoglobins and to produce the reduced hemochromogens and hemoglobin derived compounds by the action of hydrogen donators or reducing agents, the presence of which also assure against the formation of the ferric compounds of the iron constituent.

It is a further object of this invention to utilize certain enzymes naturally present in the meat and to supply by injection or otherwise, a suitable quantity of an acid, salt or suitable compound subject to the influence of the enzyme selected to produce the reducing agent referred to.

In commercial practice it is often true that meat products subjected to the same curing processes do not come out of cure, or hold up after cure, with the same brightness or redness of color. Heretofore, a certain percentage of meat products subjected to the curing operation would come out of cure unfit for sale on the market as first grade products due to the oxidation during and after curing. Such oxidation either destroys the color completely or produces only an inferior color and product necessitating tremendous discounts in price and large losses to the industry every year.

It is well known that curing meats, in respect to the effect on color, involves the fixation of the desirable pink red color by the action of nitrite on the blood pigments with the consequent production of such substances as NO hemoglobin. The present invention is directed to an improvement in the conventional cure employing nitrite, whether the nitrite is added as such or developed in situ from nitrate.

In practice, this invention provides a method by which the hemoglobin or hemochromogens are reduced or combined into proper forms so that they may become fixed with the nitrites or nitrogen compounds utilized in the curing process. It is known that hemoglobin and hemochromogens in a reduced state may combine or unite with oxygen or be oxidized in any one of several ways. When united or combined with oxygen or when oxidized the hemoglobin cannot be united or combined with the nitrite or nitrogen compounds present in the curing process to form the nitroso-hemochromogen or the pigments of desirable cure.

Therefore in accordance with this invention, a hydrogen donator or reducing agent is utilized to reduce the hemoglobin so that the hemochromogen and other blood pigments are free to unite with the nitrite or nitrogen compounds to produce the nitroso-hemochromogen or desirable pink pigment and also to assure the existence of the ferrous form of the iron constituent and the avoidance of the undesirable ferric form.

It has long been known that the oxidized hemochromogens may be reduced by such chemicals as sodium sulphite and other strong reducing agents. The disadvantages of these chemicals however, lies in the fact that they are sufficiently strong to become poisonous or otherwise toxic to persons who later consume the food products. For this reason it is not practical to use strong chemical reducing agents and as a matter of fact, the use of such strong reducing agents on edible products is prohibited by law.

It is further known that all muscle tissue contains within it, certain natural enzymes which change the activity of many chemical substances. It has now been discovered that the muscle tissues contain some enzymes which are capable of converting certain chemical compounds into active reducing agents whereas in ordinary chemical reactions they are at best only very mild reducing agents. These mild reducing agents are sometimes called hydrogen donators.

It is further known that certain muscle tissue contains certain salts such as for instance, salts or succinic acid and in addition thereto, an enzyme known as succinase, the presence and influence of which causes succinic acid to give up its hydrogen and thereby become a reducing agent for any materials present which will accept this hydrogen.

It is also known that the muscle tissue from different animals does not contain the same enzyme nor the same chemical substances suitable for activation by these enzymes. However, certain of the chemical substances which are suitable for activation by the proper enzymes may be present, if the animal is subjected to special conditions either before or after slaughter.

Accordingly, by the practice of this invention, a sufficient quantity of the proper mild chemical substances suitable for activation as a reducing agent by the natural muscle enzymes, will be present in the tissue of the meat for a certain period before this tissue is subjected to the usual curing treatment.

By way of illustration, it has been found that sodium malate is capable of acting as a reducing agent for the oxidized hemochromogens methemoglobin, and the greenish gray ferric compounds derived from the oxidation of blood pigment in the presence of the enzyme malase found naturally in pork muscular tissue. Further, it is found that sodium citrate can act as a reducing agent for oxidized hemochromogens methemoglobin, and the greenish gray ferric compounds derived from the oxidation of blood pigment in the presence of the enzyme citrase which also occurs naturally in pork muscle tissue. Likewise there are other salts, such as succinates, tartrates, lactates and others which may be selected depending upon the type of meat undergoing treatment and the nature of the enzymes naturally present in the muscle tissue of the meat.

Accordingly, this invention contemplates forcing through the arterial system of the animal, preferably immediately following slaughter and before the tissues have set in rigor mortis, a dilute solution of substances selected from the following group: any one or more of the following acids or their salts: succinic, malic, citric, tartaric, lactic, glycerophosphoric, aspartic, glutamic, glutaric and the salts of asparagine (asparaginates).

In practice, it is the purpose of this invention to assure the presence of a suitable quantity of one of the selected chemical substances in the muscle of the meat undergoing treatment or in the curing vat and at the proper time, whereby to insure satisfactory reduction of the oxidized hemochromogens methemoglobin, and the greenish gray ferric compounds derived from the oxidation of blood pigment so as to render them free to react with the nitrites present in the curing process for the production of the nitroso-hemochromogens or nitroso hemoglobins with the resulting fixed, bright red color.

Purely by way of example, one method of procedure by which this invention may be practiced is as follows:

Immediately following slaughter of the animal and before the tissues have set in rigor mortis, a dilute solution of about 0.1 per cent of sodium malate is pumped through the arterial system to the capillaries whereby there is assured a proper quantity of sodium malate in proper distribution throughout the tissues. Thereafter, the usual slaughter house practice for curing may be put in effect whereby the hams, or other pieces to be cured may be held either at low temperatures just above the freezing point or actually frozen hard, until it is desired to subject them to the actual curing treatment.

During this holding period the enzymes will cause the desired reaction upon the injected chemical substances so that the proper reduction of the blood pigments takes place and insures proper conditions for color fixation during the later curing treatment.

As above pointed out, when a meat containing the enzyme malase is being cured, a malate salt may be employed in accordance with the above specific example. In such cases the malate salt is acted upon by the enzyme malase and is thereby converted to the desired reducing agent which acts to reduce the blood pigments so that they are free to react with the nitrites of the curing bath, and to hold the iron constituents thereof as ferrous instead of ferric iron.

It is to be understood that the reducing agent not only acts to reduce the blood pigments to prepare them for reaction with the nitrites of the curing bath but its presence during the curing treatment and thereafter, prevents the conversion of the ferrous iron to ferric iron, with the corresponding elimination of color spoilage.

It is found that the oxidation producing spoilage is practically always attributable to the elaboration by bacteria of peroxides both of hydrogen and organic groups. However, in practicing the invention, the presence of the reducing agent will exert its influence on the oxidation effects produced by such bacteria whereby to maintain the blood pigments in the desired reduced state. The action of the enzymes on their respective acids or salts is not definitely understood but by way of illustration, it may be mentioned that in the case of sodium citrate, it is believed there is first, a hydrolizing action after which free hydrogen is split off.

It is to be understood that this invention is not to be restricted to the particular illustrations here given, as this invention involves utilization of the enzymes present in meat and the introduction of a quantity of a salt of a type acted upon by any desired one of the enzymes present for producing a reducing agent or hydrogen donator in accordance with the above described reactions and thus utilizing the reducing agent so produced for assuring a reduction of the blood pigments in the meat products and thereby the desired bright redness of color.

Although the invention has its greatest application in connection with meat curing processes, wherein the blood pigments are reduced and rendered capable of uniting with the nitrites or nitrogen compounds to form nitroso hemoglobins or nitroso-hemochromogens, it is nevertheless intended that the invention also include the formation of the reducing agents by the enzyme and injected salt for maintaining the ferrous form of the iron constituent of the hemoglobin with the avoidance of the destructive effects of bacterial elaborations of oxidases and peroxides, during any period of shipment, storage or curing as the case may be.

The term "reducing agent" as used in this specification and in the claims which follow, does not include the well-known chemical reagents such as sulphites and the like. The term "reducing agent" is here used in the sense of a hydrogen donator, that is, a compound forming active hydrogen in the presence of a specific enzyme. For example, sodium citrate or any soluble salt of citric acid will react in the presence of citrase or enzyme from hog muscle tissues as follows:

Sodium citrate plus water=

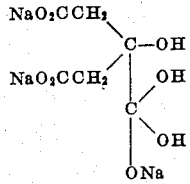

In presence of citrase (enzyme of pork muscle known as a dehydrogenase) the citrate gives up hydrogen as follows:

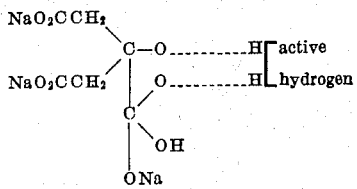

Hydrogen is then the "reducing agent" in this biological system.

I claim:

1. In the curing of meat the steps of adding to the meat a compound which is to be converted to a reducing agent by the action of certain enzymes present in said meat and subjecting the meat to the action of a color fixing curing agent.

2. The method of curing meat products which comprises producing a reducing agent in the meat products by injecting in said meat a compound subject to being acted upon by enzymes present in said meat to form a reducing agent, thereafter permitting said enzymes to convert said compound into a reducing agent and subjecting the meat to the action of a color fixing curing agent.

3. The method of treating meat which involves injecting a chemical substance selected to form a reducing agent by the action of enzymes present in said meat, permitting enzymes in said meat to convert said substance to a reducing agent, causing said reducing agent to reduce the blood pigments of said meat and curing said meat with curing agents including nitrite.

4. The method of treating meat which involves injecting a chemical substance selected to form a reducing agent by the action of enzymes present in said meat, permitting enzymes in said meat to convert said substance to a reducing agent, and then causing said reducing agent to reduce the blood pigments of said meat and providing an excess of said reducing agent to maintain the iron constituent of the blood pigments in the form of ferrous iron and subjecting the meat to the color fixing action of a nitrite.

5. The method of treating meat which involves injecting a chemical substance selected to form a reducing agent by the action of enzymes present in said meat, permitting enzymes in said meat to convert said substance to a reducing agent and then causing said reducing agent to reduce the blood pigments of said meat, and thereafter forming nitroso compounds or desirable pink pigment by reaction with a nitrite.

6. The method of treating meat which involves injecting a chemical substance selected to form a reducing agent by the action of enzymes present in said meat, permitting enzymes in said meat to convert said substance to a reducing agent and then causing said reducing agent to reduce the blood pigments of said meat, and thereafter forming nitroso compounds by reaction with a nitrite and providing an excess of reducing agent to maintain the iron constituent of the hemochromogen in the form of ferrous iron.

7. In the preparation of meats the process which comprises forcing through the arterial system of the animals immediately following slaughter and before the tissues have set in rigor mortis, a dilute solution of substances selected from the following group: any one or more of the following acids or their salts: succinic, malic, citric, tartaric, lactic, glycerophosphoric, aspartic, glutamic, glutaric and the salts of asparagine (asparaginates) and curing said meat with curing agents, including nitrite.

8. In the preparation of meats, the step which comprises adding thereto any substances from the following group; namely, any one or more of the following acids or salts thereof; succinic, malic, citric, tartaric, lactic, glycerophosphoric, aspartic, glutamic, glutaric and the salts of asparagine (asparaginates), whereby a reducing agent is formed by the action of enzymes present in the meat and curing said meat with curing agents, including nitrite.

9. The method of curing meats which comprises adding thereto a compound which is converted to a reducing agent generated in situ in said meat by the action of enzymes contained therein, thereby effecting a reduction of the oxidized blood pigments, and subjecting the meat to the color fixing action of a nitrite.

10. The method of assuring bright pink color in meat products which comprises adding thereto a compound which is converted to a reducing agent generated in situ in said meat by the action of enzymes contained therein, maintaining the iron constituent of the blood pigments as ferrous iron by said reducing agent and subjecting the meat to the color fixing action of a nitrite.

11. The method of treating meat products which comprises adding a compound thereto which is converted to a reducing agent generated in situ in said meat by the action of enzymes contained therein, subjecting the meat to the action of a color fixing nitrite, reducing the blood pigments present in said meat and forming nitroso-compounds therefrom, and maintaining the iron constituent of said nitroso-compounds as ferrous iron by the presence of said reducing agent.

LLOYD B. JENSEN.